June 5, 1928.
I. R. HIPPENMEYER
1,672,258
VALVE
Filed Oct. 23, 1926
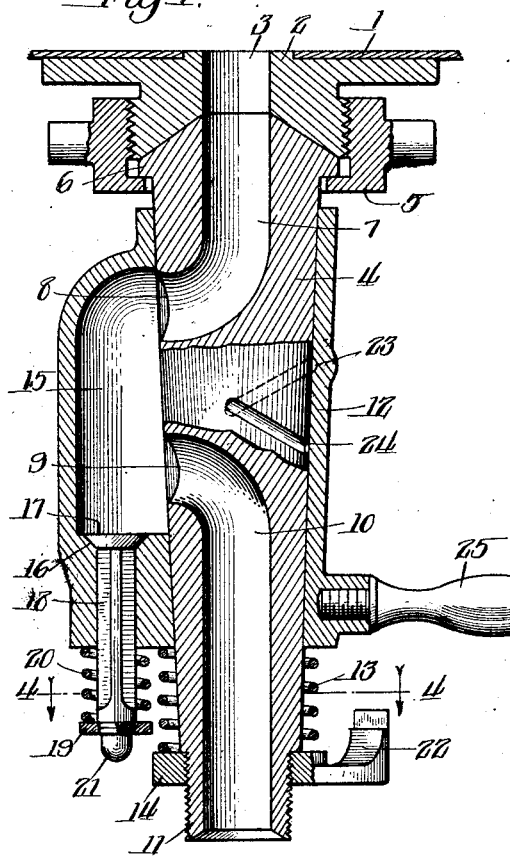
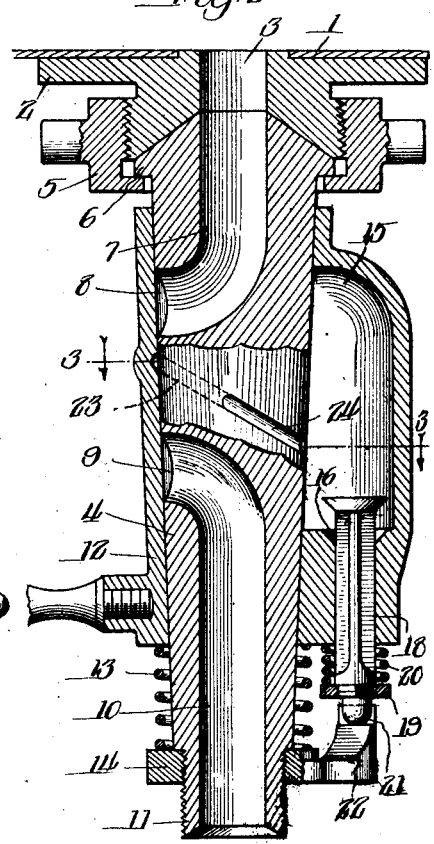
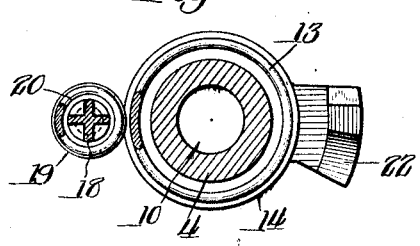
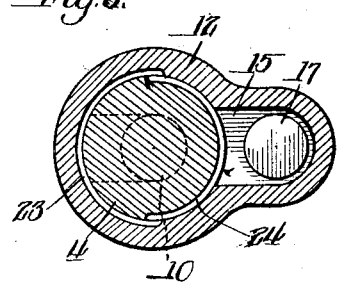
Inventor:
Irving R. Hippenmeyer,
By Hewitt S. Dixon
Atty Patented June 5, 1928.

1,672,258

UNITED STATES PATENT OFFICE.

IRVING R. HIPPENMEYER, OF WAUKEGAN, ILLINOIS, ASSIGNOR TO THE CREAMERY PACKAGE MFG. COMPANY, OF CHICAGO, ILLINOIS, A CORPORATION OF ILLINOIS.

VALVE.

Application filed October 23, 1926. Serial No. 143,569.

The invention relates more particularly to valves for the control of edible fluids commonly known as sanitary valves.

In milk Pasteurization one of the commonly practiced methods is to hold quantities of the milk at a pre-determined temperature for a pre-determined time in suitable containers, the containers being filled and emptied through piping controlled by sanitary valves. It will be obvious that any leakage or failure in these valves will permit the uncontrolled flow to or from the container of a quantity of milk which has not been held for the required time at the necessary temperature. If such leakage is permitted to pass into the discharge line with the properly Pasteurized milk, the latter is in danger of reinoculation by the undestroyed bacteria in the milk which has escaped the prescribed treatment.

It is the principal object of this invention to provide an improved sanitary valve for controlling the filling and emptying of Pasteurizing holders, which is constructed to intercept and direct outwardly from the main passages any leakage occurring in the valve when it is in closed position.

Other objects and advantages will be apparent in the following detailed description of a preferred embodiment of the invention which I have selected for illustration in the accompanying drawings. It will be understood, however, that various changes in form, construction and arrangement may be made by those skilled in the art without departing from the scope and spirit of the invention as expressed in the appended claims.

Referring to the drawings, Fig. 1 represents a sectional elevation of the valve structure, the valve being illustrated in this figure in opened position. Fig. 2 is a similar sectional elevation with the valve parts illustrated in closed position. Fig. 3 is a cross sectional view taken on the planes of the irregular line 3—3 in Fig. 2. Fig. 4 is a cross sectional view taken on the plane of the line 4—4 in Fig. 1.

The numeral 1 indicates the bottom wall of a liquid holding container to which is suitably secured a fixture 2 having an outlet opening 3 passing therethrough. Abutting the fixture 2 is a core member 4, preferably removably secured to the fixture by means of a union nut 5 threaded upon a suitably formed portion of the fixture 2 and engaging a flange 6 of the core. The core 4 is formed preferably with a tapered or conical outer contour. The end of the core adjacent the fixture 2 is provided with a longitudinal inlet passage 7, in register with the container outlet opening 3 at its upper end and in communication at its lower end with a port opening 8 in the lateral periphery of the core. Spaced from the port opening 8 is a second port opening 9 which communicates with an outlet passage 10 extending longitudinally through the opposite end of the core, the latter being preferably provided at its lower extremity with screw threads 11 for the attachment of suitable piping to receive the discharged liquid.

Mounted upon the core 4, in rotatable operative relation thereto, is a rotatable casing 12 internally forming a seat for the conically formed core 4 and controlling the two port openings 8 and 9. The casing 12 is retained in seated relation to the core 4, preferably by means of a coiled spring 13 bearing upon the lower end of the casing and outwardly supported by means of an annular abutment 14 threaded upon the lower end of the core. The casing may be rotated upon the core by means of a handle 25.

The casing 12 is provided with a lateral chamber 15 which opens upon the core 4 and is of sufficient dimensions to uncover both of the port openings 8 and 9 when positioned thereover. The chamber 15 functions to open communication between the ports 8 and 9 for the flow therethrough of liquid from the inlet passage 7 to the outlet passage 10. The lower wall of the chamber 15 is provided with an auxiliary outlet opening 16 leading outwardly of the casing independently of the normal valve passages. The auxiliary outlet opening 16 is controlled by a valve 17 carried by the longitudinally grooved stem 18 having guiding bearing in the auxiliary outlet passage. The stem 18 carries upon its outer end portion a stop washer 19 serving as an abutment for the coiled spring 20 oppositely confined by the end wall of the casing, and thereby normally retaining the auxiliary outlet valve 17 in closed position. The outer extremity 21 of the stem is adapted to be engaged by a cam 22 carried by the retaining washer 14, the cam being of such form and in such position that with the operative rotation of the valve casing 12 to swing the chamber 15 out of register with the port openings 8 and 9, the auxiliary outlet valve 17 is raised from its seat and the auxiliary outlet is opened.

The casing 12 is provided with a leakage intercepting channel 23 formed in its inner periphery and extending partially around the core 4. The leakage diverting channel 23 in the casing is positioned approximately opposite to the chamber 15 and between the port openings 8 and 9 when the casing is in position with the chamber 15 out of register with the port openings, (see Fig. 2) and is preferably formed with a downward inclination toward its ends. A complementary leakage diverting channel 24 is formed in the core 4, being positioned approximately opposite to the port openings 8 and 9 and extending partially around the periphery of the core, preferably with a downward inclination from its ends. The leakage diverting channels 23 and 24 are positioned in relation to each other so that when the port openings 8 and 9 are closed the extremities of the two channels are in overlapping relation, forming a continuous pasage about the core and opening into the chamber 15. It will here be obvious that any leakage occurring from the inlet passage port between the core and its casing, will be intercepted by the channels 23 and 24 and diverted into the chamber 15 from which it freely escapes through the open auxiliary outlet 16. When the ports 8 and 9 are in communication through the chamber 15, the auxiliary outlet 16 is closed.

I claim as my invention:

1. A device of the class described, comprising a core having an inlet passage and an outlet pasage, said passages communicating respectively with a pair of spaced lateral ports in said core, said core having also a peripheral channel extending partially around said core approximately opposite of said ports, and a casing laterally enclosing said core in rotatable relation and normally closing said ports, said casing having a lateral chamber opening toward said core and adapted to be moved by the operation of said casing into simultaneous communication with said ports, said casing having also an inner peripheral channel extending partially around said casing approximately opposite of said chamber, said channels being positioned for inter-communication when said ports are closed to form a continuous passage between and spaced from said ports and opening into said chamber.

2. A device of the class described, comprising a core having an inlet passage and an outlet passage, said passages communicating respectively with a pair of spaced lateral ports in said core, a casing laterally enclosing said core in rotatable relation and normally closing said ports, said casing having a lateral chamber opening toward said core and adapted to be moved by the operation of said casing into simultaneous communication with said ports, said casing having an auxiliary outlet opening from said chamber, a valve controlling said auxiliary outlet, and means for opening said auxiliary valve when said ports are closed and for closing said auxiliary valve when said ports are in communication with said chamber.

3. A device of the class described, comprising a core having an inlet passage and an outlet passage, said passages communicating respectively with a pair of spaced lateral ports in said core, said core having also a peripheral channel extending partially around said core approximately opposite of said ports, a casing laterally enclosing said core in rotatable relation and normally closing said ports, said casing having a lateral chamber opening toward said core and adapted to be moved by the operation of said casing into simultaneous communication with said ports, said casing having also an inner peripheral channel extending partially around said casing approximately opposite of said chamber, said channels being positioned for inter-communication when said ports are closed to form a continuous passage between and spaced from said ports and opening into said chamber, said casing having an auxiliary outlet opening from said chamber, a valve controlling said auxiliary outlet, and means for opening said auxiliary valve when said ports are closed and for closing said auxiliary valve when said ports are in communication with said chamber.

4. A device of the class described, comprising a core having an inlet passage and an outlet passage, said passages communicating respectively with a pair of spaced lateral ports in said core, and a casing laterally enclosing said core in rotatable relation and normally closing said ports, said casing having a lateral chamber opening toward said core and adapted to be moved by the operation of said casing into simultaneous communication with said ports, said casing having an auxiliary outlet opening from said chamber, a valve normally closing said auxiliary outlet, and a cam carried by said core positioned to engage and open said auxiliary valve when said casing is in position of closing said ports.

5. A device of the class described, comprising a core having a pair of spaced lateral ports, and a casing forming a seat for said core in rotatable relation thereto, said casing having a chamber adapted to establish communication between said ports in one relative position of said casing and said core, said casing having a channel opening upon and extending partially about said core, and said core having a channel extending partially thereabout and opening upon said casing, said channels being arranged for overlapping interconnection when said ports are closed to form a continuous passage about said core between said ports and opening into said chamber.

It witness whereof I have hereunto attached my signature.

IRVING R. HIPPENMEYER.